United States Patent
Robertson et al.

(10) Patent No.: US 10,418,880 B2
(45) Date of Patent: Sep. 17, 2019

(54) ELECTRICITY GENERATOR AND METHODS FOR GENERATING ELECTRICITY

(71) Applicant: REGI U.S., INC., Spokane, WA (US)

(72) Inventors: John Robertson, Richmond (CA); Paul Porter, Colbert, WA (US)

(73) Assignee: Regi U.S., Inc., Spokane, WA (US)

( * ) Notice: Subject to any disclaimer, the term of this patent is extended or adjusted under 35 U.S.C. 154(b) by 95 days.

(21) Appl. No.: 15/669,589

(22) Filed: Aug. 4, 2017

(65) Prior Publication Data

US 2018/0076690 A1   Mar. 15, 2018

Related U.S. Application Data

(60) Provisional application No. 62/394,067, filed on Sep. 13, 2016.

(51) Int. Cl.
| | |
|---|---|
| *H02K 7/18* | (2006.01) |
| *F01C 1/344* | (2006.01) |
| *F01C 19/10* | (2006.01) |
| *F01C 21/10* | (2006.01) |
| *F02B 53/02* | (2006.01) |
| *F02B 53/04* | (2006.01) |
| *F02B 53/10* | (2006.01) |
| *F02B 55/08* | (2006.01) |
| *F01C 21/18* | (2006.01) |
| *F04C 2/344* | (2006.01) |
| *F04C 18/344* | (2006.01) |

(52) U.S. Cl.
CPC ........... *H02K 7/1815* (2013.01); *F01C 1/344* (2013.01); *F01C 1/3448* (2013.01); *F01C 19/10* (2013.01); *F01C 21/102* (2013.01); *F01C 21/106* (2013.01); *F01C 21/108* (2013.01); *F01C 21/18* (2013.01); *F02B 53/02* (2013.01); *F02B 53/04* (2013.01); *F02B 53/10* (2013.01); *F02B 55/08* (2013.01); *F04C 2/344* (2013.01); *F04C 18/344* (2013.01); *Y02T 10/17* (2013.01)

(58) Field of Classification Search
CPC ............................. H02K 7/1815; H02K 21/28
See application file for complete search history.

(56) References Cited

U.S. PATENT DOCUMENTS

| | | | | |
|---|---|---|---|---|
| 4,004,556 A * | 1/1977 | Pfeiffer | ................. | F01C 1/3448 123/213 |
| 4,293,777 A * | 10/1981 | Gamell | ................... | F01D 1/34 290/52 |

(Continued)

*Primary Examiner* — Viet P Nguyen

(74) *Attorney, Agent, or Firm* — Lee & Hayes, P.C.

(57) ABSTRACT

Electricity generators are provided that can include: members having opposing bases that include chambers to facilitate the conversion of source energy to mechanical energy with one of the members rotating in relation to another of the members and a housing about the rotating member. Generator components can be operably engaged to the housing and rotating member to generate electricity. Methods for generating electricity are also provided. The methods can include: rotating a first cylindrical member in relation to a fixed second member about a center rod along a shared axis within a housing; and generating electricity between conductive components along both the sidewalls of the first cylindrical member and the housing.

20 Claims, 7 Drawing Sheets

(56) References Cited

U.S. PATENT DOCUMENTS

| | | | | |
|---|---|---|---|---|
| 5,509,793 | A * | 4/1996 | Cherry | F01C 1/3448 |
| | | | | 123/243 |
| 6,222,331 | B1 * | 4/2001 | Blum | H02K 29/06 |
| | | | | 318/721 |
| 7,059,843 | B1 * | 6/2006 | Badgley | F01C 1/3448 |
| | | | | 418/148 |
| 7,080,623 | B1 * | 7/2006 | Badgley | F01C 1/3448 |
| | | | | 123/231 |
| 2005/0126175 | A1 * | 6/2005 | Badgley | F01C 11/004 |
| | | | | 60/772 |
| 2006/0008374 | A1 * | 1/2006 | Robertson | F01C 1/3448 |
| | | | | 418/111 |
| 2006/0048743 | A1 * | 3/2006 | Al Hawaj | F01C 1/3448 |
| | | | | 123/241 |
| 2008/0136113 | A1 * | 6/2008 | Grisar | F01C 1/3448 |
| | | | | 277/357 |
| 2009/0045687 | A1 * | 2/2009 | Yu | H02K 7/1853 |
| | | | | 310/154.01 |
| 2011/0171054 | A1 * | 7/2011 | Patterson | F01C 21/0845 |
| | | | | 418/266 |
| 2015/0115781 | A1 * | 4/2015 | Luparello | H02K 7/1823 |
| | | | | 310/75 R |
| 2018/0073364 | A1 * | 3/2018 | Robertson | F01C 1/344 |

* cited by examiner

ELECTRICITY GENERATOR AND METHODS FOR GENERATING ELECTRICITY

CROSS REFERENCE TO RELATED APPLICATION

This application claims priority to U.S. provisional patent application Ser. No. 62/394,067 filed Sep. 13, 2016, entitled "Rotary Engine With An Integrated Generator", the entirety of which is incorporated by reference herein.

TECHNICAL FIELD

The present disclosure relates to electrical generators and methods of generating electricity and in particular embodiments specific prime movers including electrical generator components, such as, but not limited to rotary engines and, in particular, to a rotary engine with an integrated generator.

BACKGROUND

U.S. Pat. No. 5,509,793 which issued on Apr. 23, 1996 to Cherry et al. discloses a rotary engine comprising a rotor having an annular outer wall and two bases of the rotor. The entirety of U.S. Pat. No. 5,509,793 is incorporated by reference herein. The present disclosure provides electrical generators and methods for generating electricity using a rotor having an annular outer wall and two bases.

SUMMARY OF THE DISCLOSURE

Electricity generators are provided that can include: a first cylindrical member about a center rod aligned along the axis of the first cylindrical member, the first cylindrical member defining first outer sidewalls and first opposing bases; a second cylindrical member about the center rod along the axis of the second cylindrical member, the second cylindrical member defining second outer sidewalls and second opposing bases, one of the first opposing bases opposing one of the second opposing bases, wherein one of the first or second cylindrical members rotates about the center rod in relation to the other of the first or second cylindrical members; a housing about one or both of the first and second cylindrical assemblies; electrically conductive, and or magnetic components, operably fixed to the housing and the rotating first or second member; and a plurality of chambers between the opposing first and second bases, the chambers configured to receive source energy.

Electricity generators are also provided that can include: a first cylindrical member about a center rod aligned along the axis of the first cylindrical member, the first cylindrical member defining first outer sidewalls and first opposing bases; a second member about the center rod along a central axis of the second member, the second member defining second outer sidewalls and second opposing bases, one of the first opposing bases opposing one of the second opposing bases, wherein the first cylindrical members rotates about the center rod in relation to the second member; a housing about the first cylindrical member; and electrically conductive and or magnetic, components operably fixed to the housing and the first sidewalls of the first cylindrical member; and a plurality of chambers between the opposing first and second bases, the chambers configured to receive source energy.

Methods for generating electricity are also provided. The methods can include: rotating a first cylindrical member in relation to a fixed second member about a center rod along a shared axis within a housing; and generating electricity between conductive components along both the sidewalls of the first cylindrical member and the housing.

BRIEF DESCRIPTIONS OF DRAWINGS

Embodiments of the disclosure are described below with reference to the following accompanying drawings.

DESCRIPTION

Figure 1A:
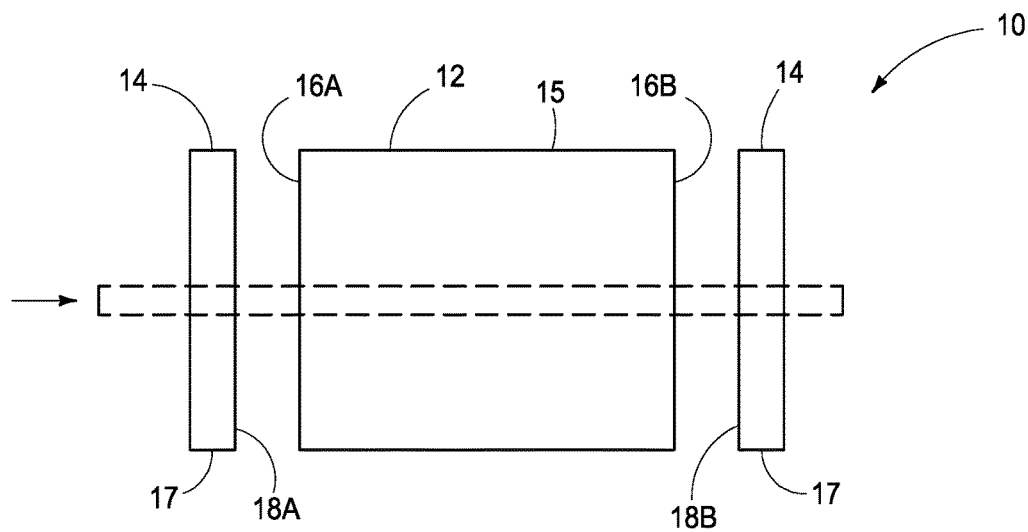
FIG. 1A is a prime mover according to an embodiment of the disclosure.

The electricity generators and methods for generating electricity will be described with reference to FIGS. 1A-5D. Referring first to FIG. 1A, an example prime mover 10 in accordance with the present disclosure is depicted. In accordance with at least one cross section, prime mover 10 is depicted in FIG. 1B and in accordance with another cross section, prime mover 10 is depicted in FIG. 1C and includes housing and generator components.

Figure 1B:
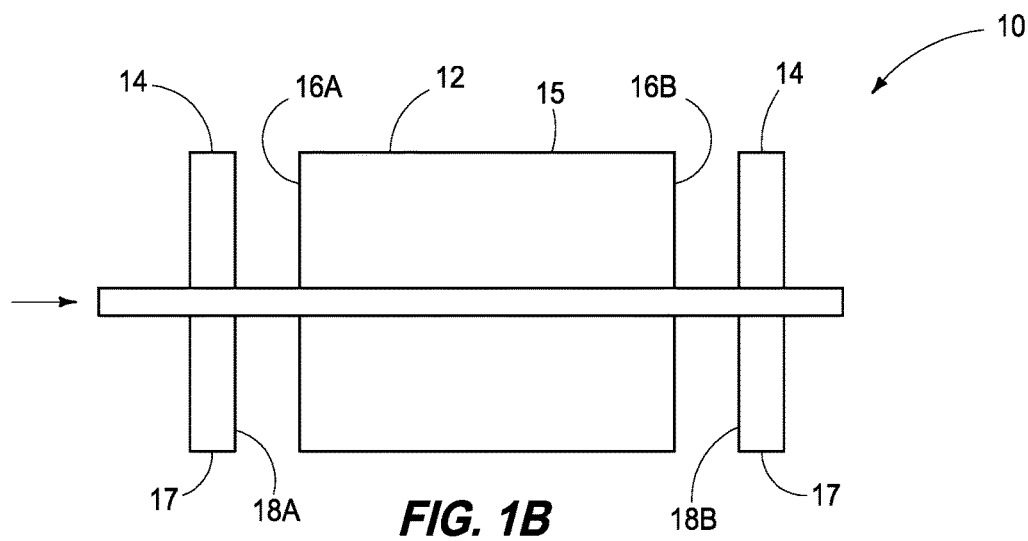
FIG. 1B is a cross section of the prime mover of FIG. 1A.
Figure 1C:
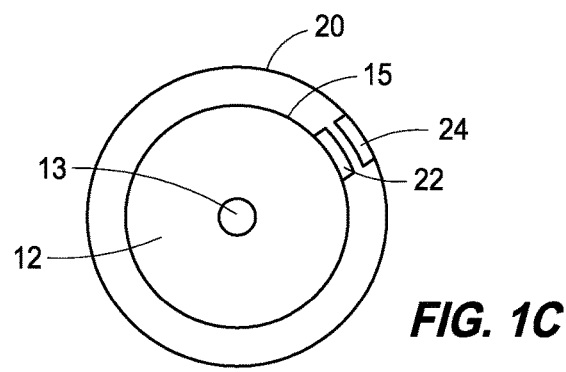
FIG. 1C is another cross section of the prime mover of FIG. 1A including a cover and generator components.

Referring to FIGS. 1A-1C, prime mover 10 can include a cylindrical member 12. This cylindrical member need not be and is not perfectly cylindrical. Member 12 need only be balanced upon center rod 13 as if it were cylindrical. Therefore, portions of member 12 may be counterbalanced with opposing portions, portions may be void, but what is included in member 12 are bases 16A and/or 16B which can be considered opposing bases about the outer sidewalls 15 of member 12. In accordance with example implementations, member 12 can be considered a rotor.

Additional members 14 are also provided. Members 14 are depicted in pairs; however, it is contemplated that a single member 14 may be sufficient to facilitate operation of prime mover 10. Further, members 14 can be cylindrical in the same sense that member 12 is cylindrical, however, wherein member 14 is fixed in relation to rotating member 12, member 14 can be of any shape having sidewalls 17 and base 18.

Prime mover 10 includes opposing bases 18A and 16A and/or 18B and 16B. In accordance with example implementations, member 12 or 14 can rotate about center rod 13 or with center rod 13, in relation to the other member. Therefore, member 12 may rotate in relation to a fixed member or members 14. Likewise, member or members 14 may rotate in relation to fixed member 12.

Referring to FIG. 1C, at least one cross section of prime mover 10 configured as a generator is shown with housing 20 about member 12. Housing 20 can include a generator component 24 with a complimentary generator component 22 fixed to housing 20. These generator components can be considered electrically conductive and or magnetic components and can be operably fixed to the housing and the rotating member, whether that be member 12 or member 14.

Prime mover 10 will have a plurality of chambers associated with the opposing bases. These chambers will facilitate the conversion of source energy to mechanical energy that drives the rotating member in relation to the fixed member.

Figure 2:
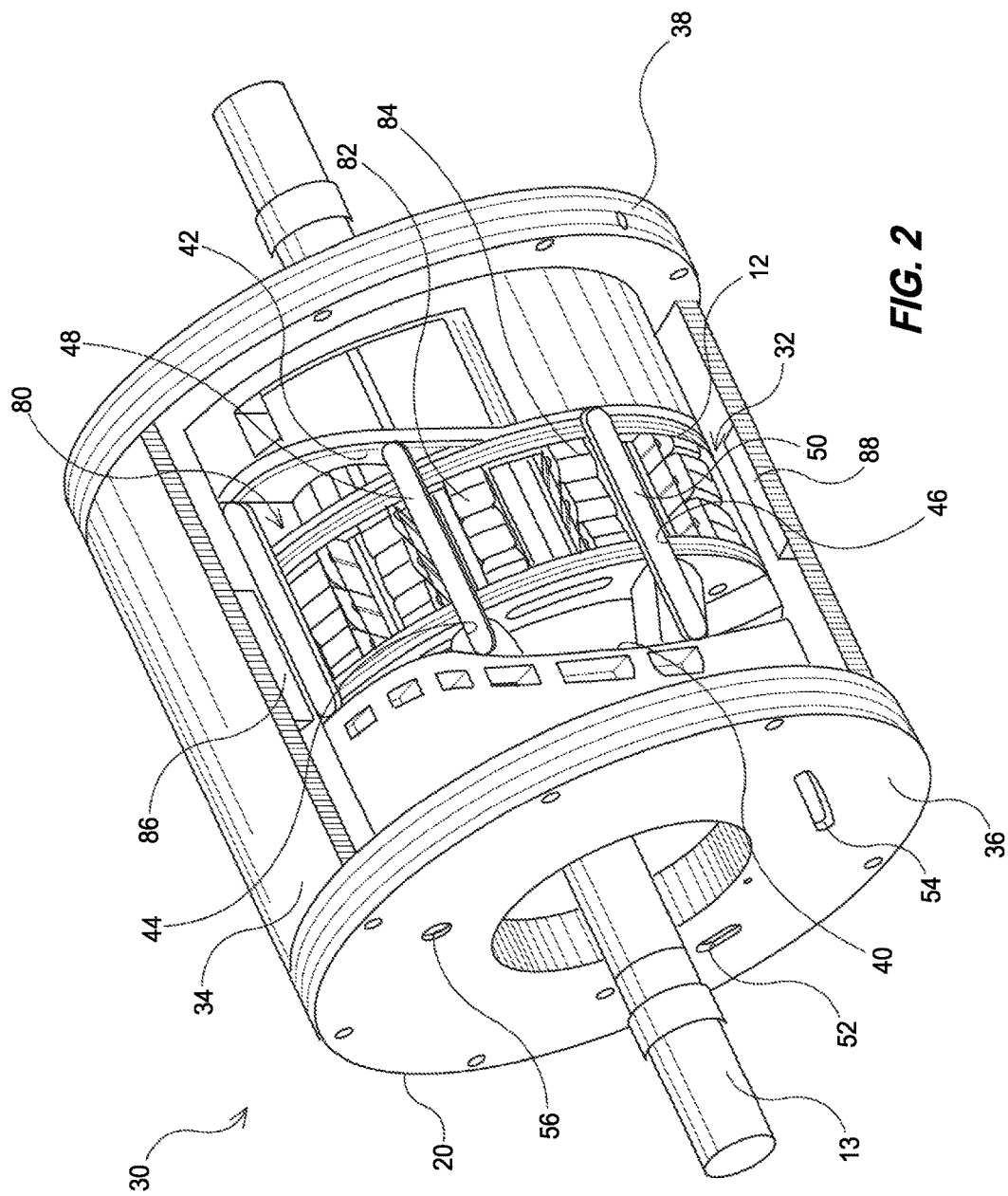
FIG. 2 is a perspective, fragmentary view of an electricity generator.

Referring next to FIG. 2, an example electrical generator 30 is shown. Generator 30 can include a housing 20 which has a substantially cylindrical internal space 32 defined by an annular wall 34 extending between opposing end walls 36 and 38. Undulating cam surfaces 40 and 42 can define chambers of bases 18A and 18B. There is also a substantially cylindrical rotor 12 disposed within housing 20 between the undulating cam surfaces 40 and 42. Rotor 12 is rotatably mounted on a center rod 13 which can be considered a drive shaft. In this depicted configuration, rotor 13 defines a plurality of slots extending axially therethrough, for example slots 44 and 46, each of which receives a corresponding slidable vane, for example vanes 48 and 50. These vanes can be slidably engaged to reciprocate axially in a direction parallel to the center rod 13 when the rotor 12 rotates. Electrical generator 30 can also include a plurality of operable ports to facilitate the introduction of source energy into the chambers between the opposing bases and the exhaust of spent source energy, for example air intake port 38, a fuel injection port 40, and an exhaust port 42 on each end wall thereof. The air intake port 52, the fuel injection port 54, and the exhaust port 56 are depicted for a generator configured as a combustion prime mover.

Figure 3:
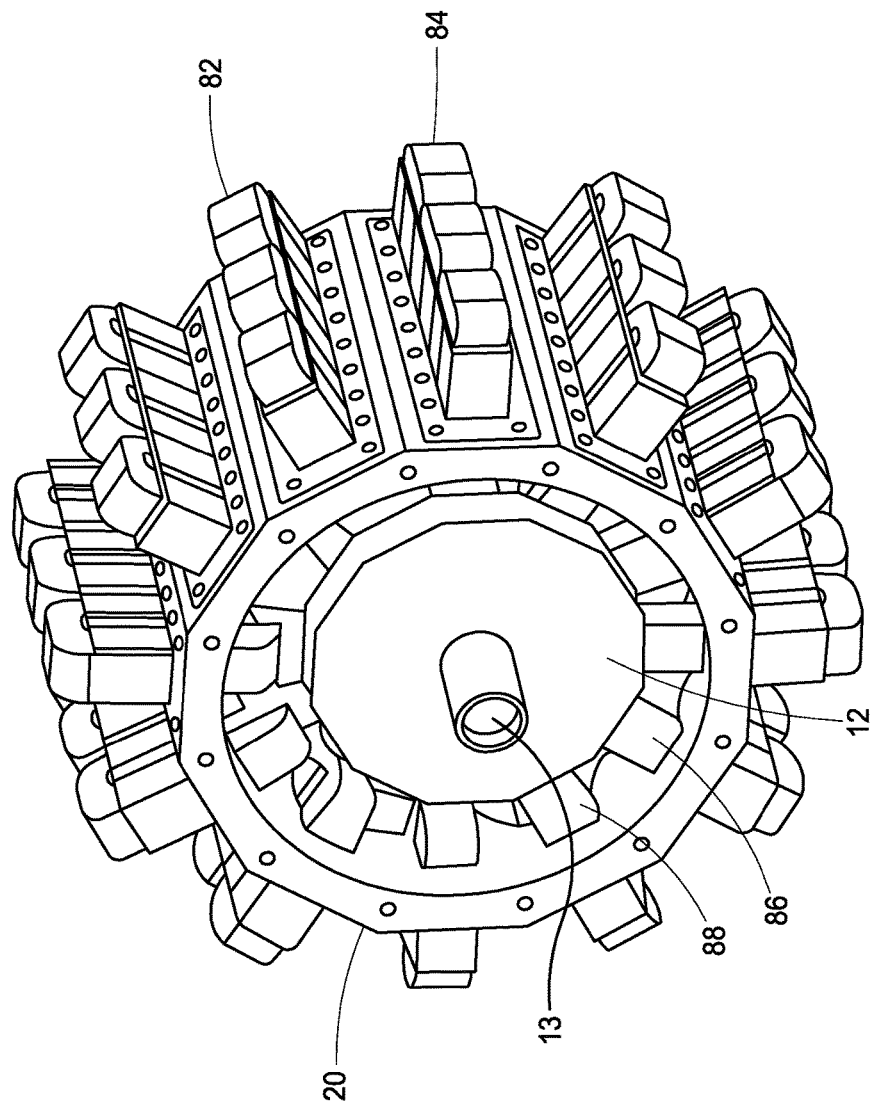
FIG. 3 is a perspective, fragmentary view of a rotor and housing of an electricity generator.

Referring next to FIG. 3, an isometric view of a rotor of generator 30 is shown. In accordance with example configurations, rotor 12 can include electrically conductive components such as armature windings 86 and 88. In this configuration, magnets, for example, magnets 82 and 84 (See FIG. 2), can be disposed within the housing 20. As depicted generator 30 is configured as a permanent magnet generator which also include additional operable elements such as a commutator and brush which are not shown. In other examples, the generator may include field windings in place of magnets and accordingly be an induction generator. In all configurations, a rotating member includes a generator component that rotates in relation to a fixed member that includes a complimentary generator component. Typically, this is the rotor rotating in relation to the housing.

The components of the prime mover of the present disclosure can facilitate the conversion of source energy to mechanical energy in multiple ways, for example combustion or expansion may be utilized to rotate the rotor about the rod 13.

Figure 4A:
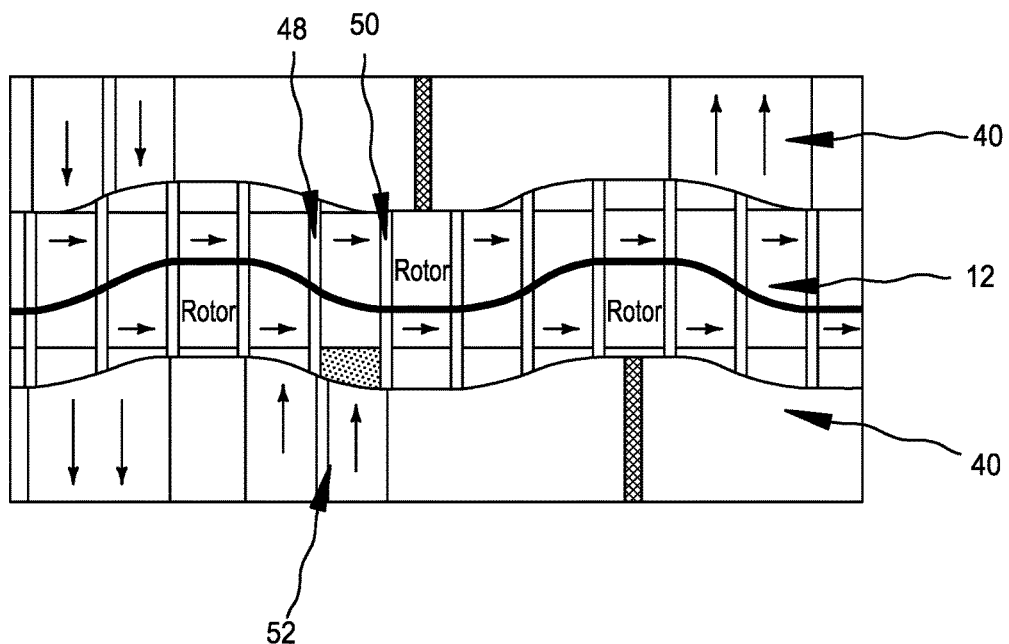
FIG. 4A is a snap shot of a combustion cycle for powering the electricity generator according to an embodiment of the disclosure.
Figure 4B:
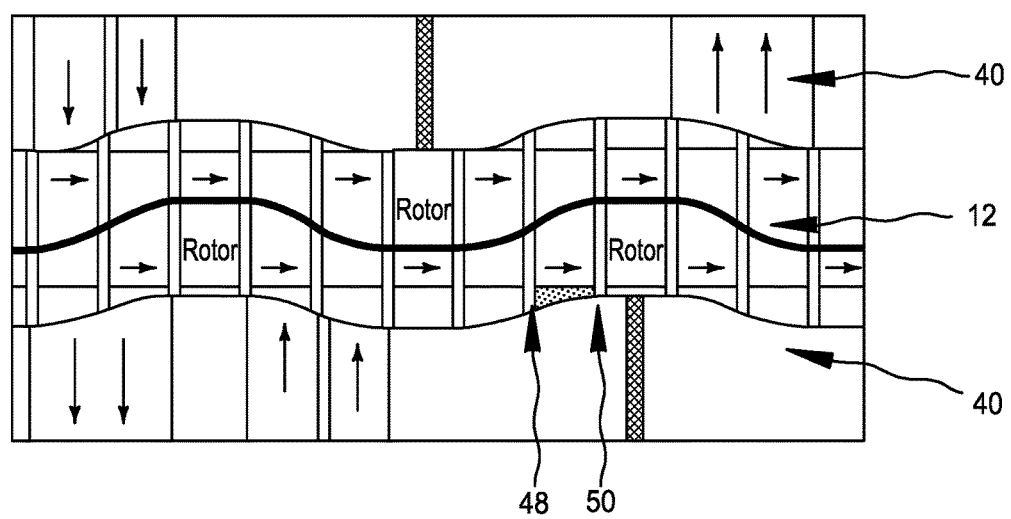
FIG. 4B is a snap shot of a subsequent combustion cycle to that of FIG. 4A for powering the electricity generator according to an embodiment of the disclosure.
Figure 4C:
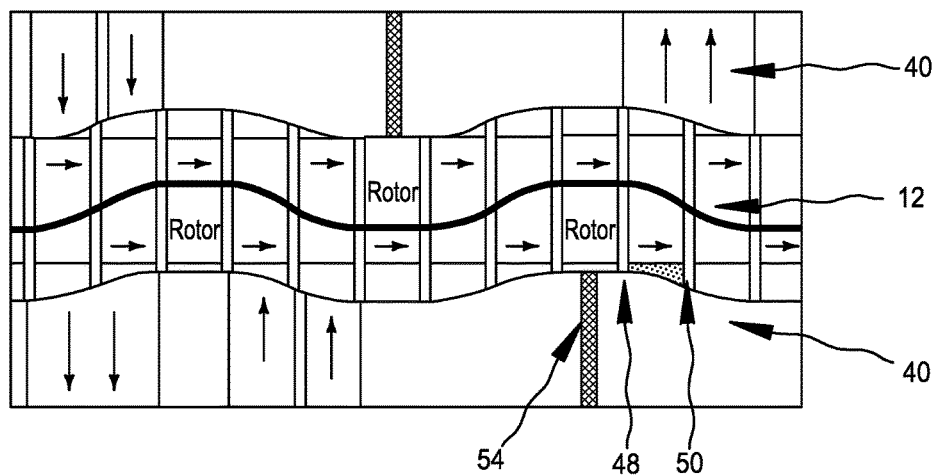
FIG. 4C is a snap shot of a subsequent combustion cycle to that of FIG. 4B for powering the electricity generator according to an embodiment of the disclosure.
Figure 4D:
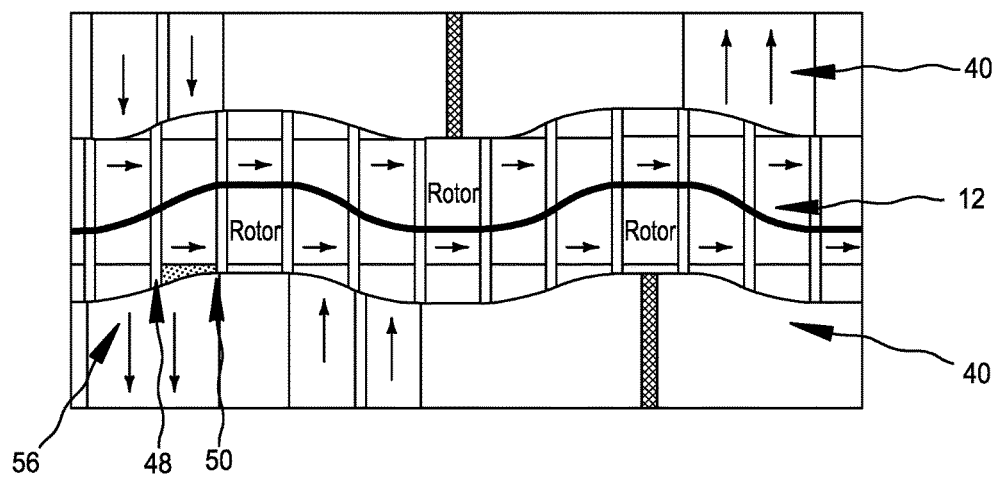
FIG. 4D is a snap shot of a subsequent combustion cycle to that of FIG. 4C for powering the electricity generator according to an embodiment of the disclosure.

Referring to FIGS. 4A-4D, combustion is utilized. Air received through the air intake port 52 during an intake stroke is trapped between adjacent vanes 48 and 50 as shown in FIG. 4A. The air is then compressed during a compression stroke due to a decreasing volume between the adjacent vanes 48 and 50 as the vanes move towards the rotor 12 as shown in FIG. 4B. Fuel received though the fuel injection port 54 is ignited and expands during an expansion stroke due to an increasing volume between the adjacent vanes 48 and 50 as the vanes move away from the rotor 12 as shown in FIG. 4C. Exhaust gases are then forced out through the exhaust port 56 during an exhaust stroke as shown in FIG. 4D.

Figure 5A:
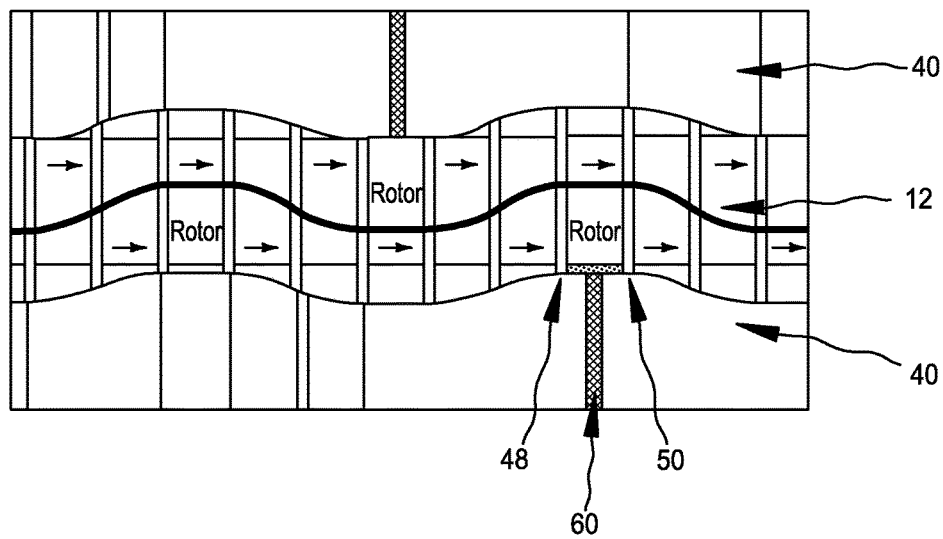
FIG. 5A is a snap shot of an expansion cycle for powering the electricity generator according to an embodiment of the disclosure.
Figure 5B:
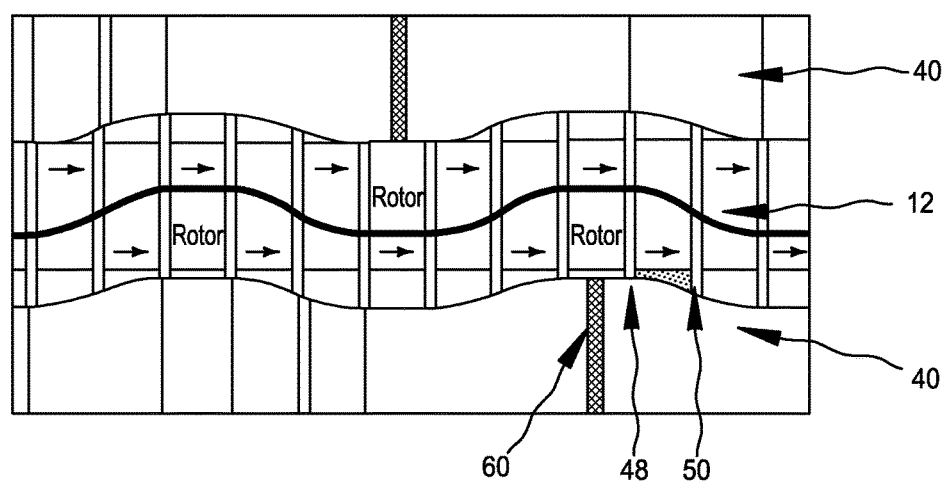
FIG. 5B is a snap shot of a subsequent expansion cycle to that of FIG. 5A for powering the electricity generator according to an embodiment of the disclosure.
Figure 5C:
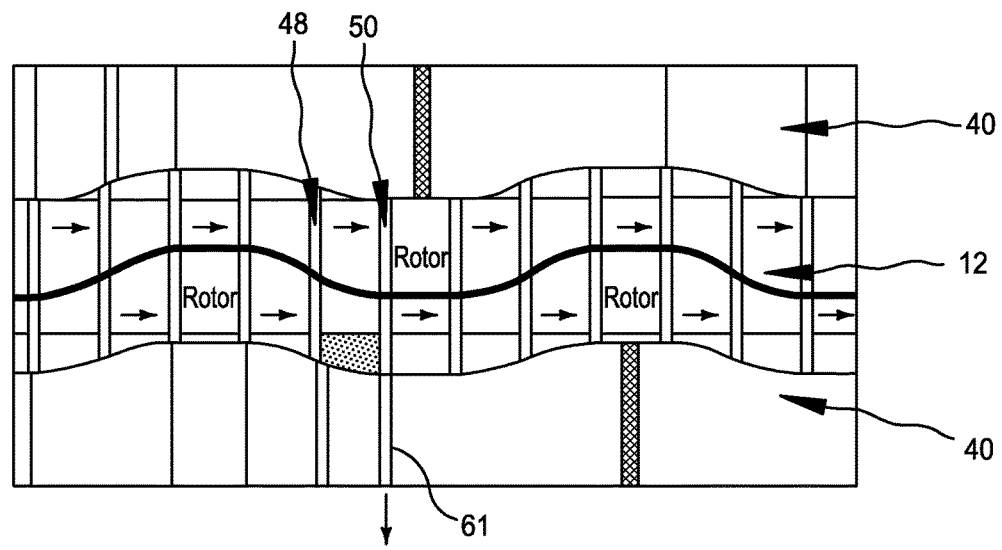
FIG. 5C is a snap shot of a subsequent expansion cycle to that of FIG. 5B for powering the electricity generator according to an embodiment of the disclosure.
Figure 5D:
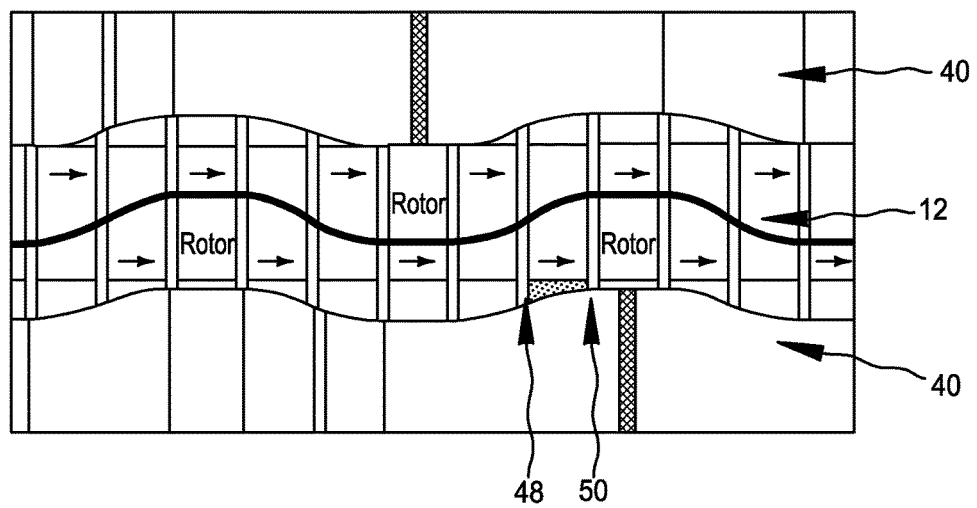
FIG. 5D is a snap shot of a subsequent expansion cycle to that of FIG. 5C for powering the electricity generator according to an embodiment of the disclosure.

Referring next to FIGS. 5A-D, an expansion driven prime mover is utilized. A working high-pressure fluid is received through intake port 60 and is trapped between vanes 48 and 50 as shown in FIG. 5A. The high-pressure fluid expands during the expansion stroke due to the increasing volume between vanes 48 and 50 as shown in FIG. 5B. The high-pressure fluid continues to drive the vanes until the leading vane 50, reaches the exhaust port 61 as shown in FIG. 5C, at which time the expanded gasses are exhausted and the cycle repeats as shown in FIG. 5D.

As disclosed, a prime mover is provided that can include a housing defining an annular wall extending between opposed end walls. Spaced-apart and opposed undulating cam surfaces are disposed within the housing. A rotor is also disposed within the housing between the undulating cam surfaces. The rotor can be configured to slidably receive a plurality of vanes. The rotary engine further includes an integrated generator having an armature winding mounted on the rotor and a magnet mounted within the internal chamber on the annular wall of the housing.

In compliance with the statute, embodiments of the disclosure have been described in language more or less specific as to structural and methodical features. It is to be understood, however, that the entire disclosure is not limited to the specific features and/or embodiments shown and/or described, since the disclosed embodiments comprise forms of putting the disclosure into effect. The disclosure is, therefore, claimed in any of its forms or modifications within the proper scope of the appended claims appropriately interpreted in accordance with the doctrine of equivalents.

The invention claimed is:

1. An electric generator comprising:
    a center rod;
    a first member coupled to the center rod and configured to rotate with the center rod, the first member including a body having an undulating surface and an outer surface extending around a perimeter of the body of the first member;
    a second member coupled to the center rod and configured to rotate with the center rod, the second member including a body having an undulating surface facing the undulating surface of the first member and an outer surface extending around a perimeter of the body of the second member;
    a third member disposed between the first member and the second member, the third member including a first surface and a second surface, the first surface facing the undulating surface of the first member and the second surface facing the undulating surface of the second member, wherein the third member is configured to remain stationary during a rotation of the center rod;
    a housing disposed over the third member and at least partially over at least one of the outer surface of the first member or the outer surface of the second member, the housing including a first electrically conductive element;

a second electrically conductive element disposed on at least one of the outer surface of the first member or the outer surface of the second member, the second electrically conductive element being complimentary with the first electrically conductive element to produce electricity during the rotation of the center rod;

a first plurality of chambers disposed between the undulating surface of the first member and the first surface of the third member, the first plurality of chambers being configured to receive a fluid; and a second plurality of chambers formed between the undulating surface of the second member and the second surface of the third member, the second plurality of chambers being configured to receive the fluid.

2. The electric generator of claim 1, further comprising a plurality of vanes slidably engaged within the third member to traverse along the undulating surface of the first member and the undulating surface of the second member.

3. The electric generator of claim 2, wherein the plurality of vanes are configured to reciprocate axially in a direction parallel to the center rod.

4. The electric generator of claim 1, wherein:
the first member comprises a first cam;
the second member comprises a second cam; and
the third member comprises a stator.

5. The electric generator of claim 1, further comprising:
a first plurality of ports within the first member; and
a second plurality of ports within the second member.

6. The electric generator of claim 1, wherein the fluid comprises a combustible fluid or steam.

7. The electric generator of claim 1, wherein:
the first electrically conductive element comprises a coil wire; and
the second electrically conductive element comprises one or more magnets.

8. An electric generator comprising:
a center rod;
a housing including an interior surface and a first electrically conductive element;
a first member including an undulating surface, the first member disposed within the housing and coupled to the interior surface of the housing;
a second member including an undulating surface, the undulating surface of the second member facing the undulating surface of the first member, the second member disposed within the housing and coupled to the interior surface of the housing;
a third member coupled to the center rod such that the third member rotates with the center rod, the third member disposed within the housing between the first member and the second member, the third member including a first surface facing the undulating surface of the first member and a second surface facing the undulating surface of the second member;
a second electrically conductive element disposed on the third member, the second electrically conductive element being complimentary to the first electrically conductive element to produce electricity during rotation of the center rod;
a first plurality of chambers disposed between the undulating surface of the first member and the first surface of the third member, the first plurality of chambers configured to receive a fluid; and a second plurality of chambers disposed between the undulating surface of the second member and the second surface of the third member, the second plurality of chambers configured to receive the fluid.

9. The electric generator of claim 8, further comprising:
a first plurality of ports within the first member; and
a second plurality of ports within the second member.

10. The electric generator of claim 9, wherein individual ports of the first plurality of ports are configured to route the fluid into individual chambers of the first plurality of chambers, and individual ports of the second plurality of ports are configured to route the fluid into individual chambers of the second plurality of chambers, the electric generator further comprising:
a third plurality of ports within the first member, individual ports of the third plurality of ports being configured to exhaust the fluid from the individual chambers of the first plurality of chambers; and
a fourth plurality of ports within the second member, individual ports of the fourth plurality of ports being configured to exhaust the fluid from the individual chambers of the second plurality of chambers.

11. The electric generator of claim 8, further comprising a plurality of vanes slidably engaged within the third member.

12. A method for generating electricity, the method comprising:
rotating a first member and a second member within a housing and in relation to a fixed third member, the first member and the second member being disposed on a rod and the third member being interposed between the first member and the second member, the first member including a body having an undulating surface facing the third member and an outer surface extending around a perimeter of the body of the first member, the second member including a body having an undulating surface facing the third member and an outer surface extending around a perimeter of the body of the second member; and
generating electricity via conductive or magnetic components disposed on at least one of the outer surface of the first member or the outer surface of the second member and another of the conductive or magnetic components disposed on the housing around the first member and the second member.

13. The method for generating electricity according to claim 12, further comprising providing a fluid to a plurality of chambers located between the undulating surface of the first member and the undulating surface of the second member, the fluid causing the first member and the second member to rotate.

14. The method for generating electricity according to claim 13, further comprising providing the fluid through at least one of:
a first plurality of ports within the first member; or
a second plurality of ports within the second member.

15. The method for generating electricity according to claim 12, wherein the conductive components comprise an armature.

16. The method for generating electricity according to claim 12 wherein the third member comprises a stator affixed to the housing.

17. The method for generating electricity according to claim 12, wherein direct current is generated.

18. The method for generating electricity according to claim 12, wherein alternating current is generated.

19. The method for generating electricity according to claim 12, further comprising combusting a fluid within at least a portion of a plurality of chambers between at least one of the first member and the third member or the second member and the third member, the combustion causing the first member and the second member to rotate within the housing.

20. The method for generating electricity according to claim 12, further comprising expanding a fluid within at least a portion of a plurality of chambers between at least one of the first member and the third member or the second member and the third member, the combustion causing the first member and the second member to rotate within the housing.

* * * * *